I. KITSEE.
TELEGRAPHY.
APPLICATION FILED FEB. 9, 1914.

1,247,120.

Patented Nov. 20, 1917.
2 SHEETS—SHEET 1.

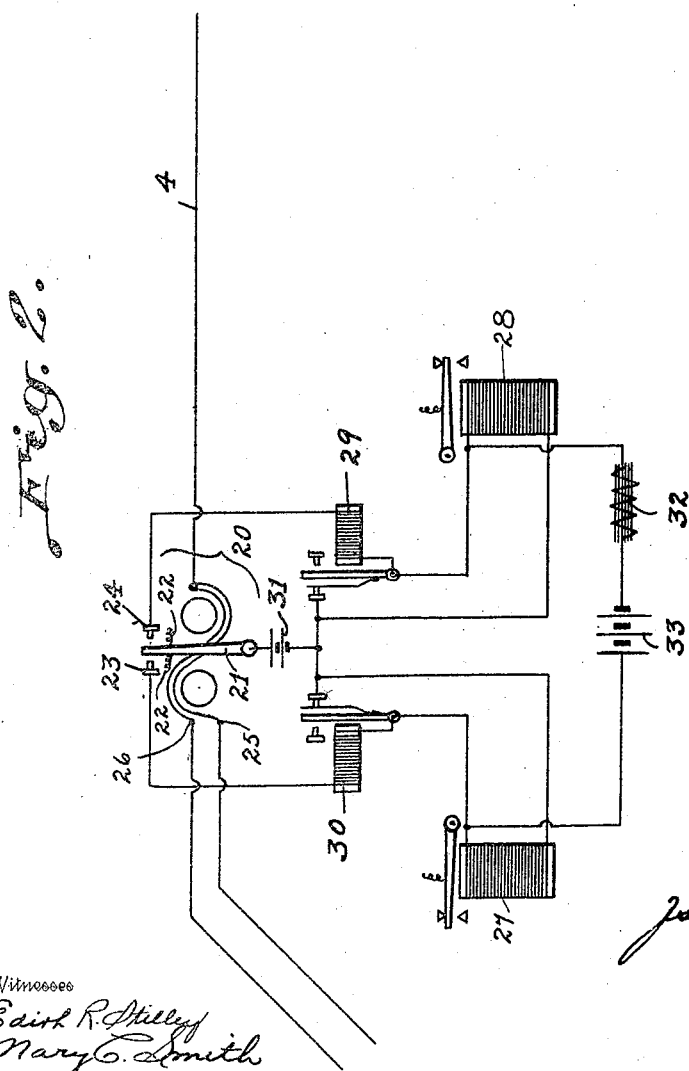

UNITED STATES PATENT OFFICE.

ISIDOR KITSEE, OF PHILADELPHIA, PENNSYLVANIA, ASSIGNOR, BY MESNE ASSIGNMENTS, TO AMERICAN TELEPHONE AND TELEGRAPH COMPANY, OF NEW YORK, N. Y., A CORPORATION OF NEW YORK.

TELEGRAPHY.

1,247,120.      Specification of Letters Patent.      Patented Nov. 20, 1917.

Application filed February 9, 1914. Serial No. 817,616.

*To all whom it may concern:*

Be it known that I, ISIDOR KITSEE, a citizen of the United States, residing at Philadelphia, in the county of Philadelphia and State of Pennsylvania, have invented certain new and useful Improvements in Telegraphy, of which the following is a specification.

My invention relates to an improvement in telegraphy. Its object is to receive simultaneously two messages transmitted from one terminal of the line with the aid of one single line relay at the second terminal of the line and translate these two messages, each separately, with the aid of local circuits into readable characters.

In prior applications I have described and claimed different arrangements to produce this effect and the present invention has more special reference to arrangements of the character herein described and illustrated.

It is obvious that changes in the transmitting as well as receiving circuits may be made without departing from the scope of my invention.

The principal features of the invention lie in the arrangement of the transmitting circuit and in the arrangements whereby a necessary unit of time is given to the operation of the translating circuit in the receiving device.

One form my invention may take is illustrated in the accompanying drawing, in which Figure 1 shows diagrammatically the transmitting circuit and Fig. 2 the receiving circuit.

In the transmitting circuit, 1 is a source of alternating current having one terminal grounded; 2 and 3 are sources of direct current. All of these sources are here illustrated as generators, but it is obvious that instead of direct current generators, batteries may be substituted.

Of the two generators 2 and 3, the electromotive force should be alike and, as is clearly illustrated in the drawing, they are connected in the circuit in opposition.

4 designates part of the line of transmission to which the three generators are connected in series.

The transmitting circuit is provided with two transmitting stations provided with keys designated respectively as A' and B'. The line is grounded at 5. 6 and 7 are two relays consisting of electromagnets provided with the armatures 8 and 9, respectively. 10 is a wire connecting the upper stops 11 and 12, respectively, of the two electromagnets to the free pole of the alternator 1. 13 is a wire connecting the armatures 8 and 9 of the two electromagnets to ground.

Normally, therefore, that is, when the two electromagnets are not energized, the source of alternating current 1 is shunted, first, through the armature of electromagnet 6 and, second, through the armature of electromagnet 7 and as the two sources of direct current 2 and 3 are in opposition as to each other, it is obvious that normally no current will flow over the line.

It is now supposed that the operator at A' transmits a message. He manipulates the key in the usual manner. This key is connected with the lever to point 14 and with the lower stop through wire 15 to the junction 16 of the two coils of the electromagnets 6 and 7. Therefore, as soon as this key is closed, one of the sources of direct current, here the source 2, is short circuited and the source of direct current 3 will be operative and current from this source will be transmitted over the line as long as the key of A' is closed. At the same time, the shunt around the alternating source 1 is broken on account of the armature 8 of the electromagnet 6 being drawn away from the upper stop 11, but as the electromagnet 7 is in series with the relatively high resistance of the line, the armature 9 is not attracted and the shunt through said armature is still intact, no current from the alternator will flow over the line.

We, therefore, have when key of A' is closed, simple direct current impulses flowing over the line coinciding with the manipulatian of said key.

It is now supposed that the operator at B' transmits messages. He manipulates the key in the usual manner and through the closing of this key, a shunt is established around the source of direct current 3, thereby allowing the current from 2 to flow over the line coinciding with the closing of said shunt. Through the closing of this shunt, the electromagnet 7 will be energized and the shunt around alternator 1 will be broken on account of the armature 9 of the electromagnet 7 being drawn away from the upper stop 12, but as the shunt around 1 is still maintained through the armature of electromagnet 6, no current from the alternator will flow over the line through the operation of the key of B'.

It is now supposed that both operators transmit messages simultaneously, that is, both depress their keys at one and the same time.

Through the depression of key at A', a shunt is established around the source of direct current 2 and through the depression of key at B', a shunt is established around the source of direct current 3, but at the same time, both shunts of the alternator 1 are opened and the current from the alternator 1 is, therefore, free to flow over the line.

To summarize:—When the key at A' is closed, only a direct current from 3 will flow over the line. When the key at B' is closed, only a direct current from source of direct current 2 flows over the line; but when both keys are simultaneously depressed, an alternating current will flow over the line and the flow will last as long as both keys are depressed; but at the moment that one of these keys is opened, then a shunt is reëstablished around the source 1 and opened at one or the other of the sources of direct current 2 or 3.

At the receiving end, 4 is a continuation of circuit 4 of the transmitting end and includes the opposed windings 25 and 26 of a polarized relay 20. This polarized relay is provided with the armature 21 held in its zero position by the springs 22 between contacts 23 and 24. In other words, this relay is what is technically known in telegraphy as a "polarized differential relay", but has means to normally keep the tongue or armature out of contact with the forward as well as back stops. 27 and 28 are two sounders or similar telegraphic translating devices at receiving stations corresponding respectively to the transmitting stations B' and A'. 29 and 30 are, what I call, two "timing" devices. They are here shown as electromagnets adapted to vibrate armatures in quick succession as long as a current flows through the coil of the electromagnets.

The armature 21 of the line relay is connected through a source of current 31 with both back stops of timers 29 and 30.

32 is an impedance and 33 is a source of current connected in series with the windings of sounders 27 and 28, which, however, are normally shunted at the back contacts of the timing devices 30 and 29.

As long as the tongue or armature of this line relay 20 remains at the zero position, the circuit of battery 31 is interrupted.

Let us now suppose that a direct current is transmitted from the transmitting station A by one of the keys and that thereby the tongue of the relay 20 is brought in contact with 24. A circuit, therefore, is established from the positive pole of battery 31, the armature 21, stop 24, coil of timer 29, coil of sounder or similar translator 28, and return to the negative pole of said source. This operates the timer 29, which opening its back contact removes the shunt from sounder 28 causing its energization. The energizing of the sounder or similar translator will coincide with the length of the flow of this current. In other words, the received impulse will operate the translating device 28 in the same manner as direct currents operate today sounders on a line of transmission.

When through the arrival of a direct current impulse of opposite polarity, the tongue 21 of the line relay is driven in contact with stop 23, then a circuit is established for the source of current 31 including coil of timer 30 and coil of sounder or similar translating device 27, thereby operating the sounder and translating into readable characters the arrived impulse in the same manner as the impulse of opposite polarity was translated.

It is now supposed that at the transmitting station, both keys are simultaneously depressed and that, therefore, an alternating current will flow over the line, thereby driving alternately the tongue 21 of the line relay 20, in contact with stops 23 and 24.

If no timer were employed and the impedance 32 were cut out, then this rapid movement of the tongue between contacts 24 and 23 would only result in a "chattering" of both translating devices and no readable signals would be produced; but as these timers are adjusted so as to give, in conjunction with the impedance 32, fluctuations rapid enough so as not to be felt by either of the translating devices 28 or 27, as long as the vibrations of the relay tongue last, it is obvious that through the employment of these timers, the energization of the translators 27 and 28 will be practically unbroken and the armatures of these translators will remain at the downward stop as long as these vibrations of the tongue continue and thereby both operators will be able to translate the impulses simultaneously into readable characters.

Since the sounder 28 corresponds to key at A' and the sounder 27 to key at B', when the key at A' is closed and the tongue of the relay 20 connects with 24, only the sounder 28 will answer.

When the key at B' is closed and the tongue of the relay connects with 23, only the sounder 27 will answer. But if simultaneously both keys are closed and the tongue of the line relay vibrates, through the interposition of these timers, both the translator 27 as well as the translator 28 will answer, and both receiving operators will be able to read the transmitted messages by sound.

It is obvious that if it is desired, other translating devices may be substituted for the sounders, or these sounders may be constructed so as to close other local circuits.

I have in these drawings only shown the transmitting arrangement of one terminal and the receiving arrangement of the other terminal, but in quadruplex telegraphy, as is well known, each terminal must be provided with a transmittting as well as receiving arrangement.

My invention can be, therefore, used either as a simple diplex, that is, a system whereby two messages are transmitted from one terminal of the line and simultaneously received at the other terminal of the line, or as a quadruplex, whereby two messages are simultaneously transmitted from each terminal of the line and received simultaneously on the respective terminal of the line.

With an arrangement substantially as described and illustrated, messages were transmitted over a circuit comprising more than three thousand ohms resistance.

With slight changes, this system is adaptable for submarine work a swell as land lines.

Having now described my invention, what I claim as new and desire to secure by Letters Patent is:—

1. In a telegraphic system, the combination of a single line relay comprising a tongue vibrating between two contacts, two local circuits in parallel to said vibratory tongue and connected respectively to said two contacts, a translating device in each of said local circuits, and electromagnetic means operatively related to each of said local circuits whereby the vibration of the tongue of said relay is translated into two sets of readable characters.

2. In a telegraphic system, the combination of a single line relay, two translating devices operatively related thereto for separately translating two messages into readable characters with the aid of the single line relay, and means including vibratory relays and an impedance operatively related to said translating devices to prevent chattering due to the vibrations of the tongue of the line relay.

3. In combination with one line relay and two translating devices operatively related to said line relay, an intermediate device for each of said translating devices, and means for said intermediate device to keep in operation said two translating devices through the vibratory movement of the tongue of said relay due to the arrival of rapidly recurring or alternating impulses.

4. In a system of telegraphy adapted to transmit simultaneously two messages from one terminal of the line, a transmitting station comprising three sources of current, one source adapted to generate alternating pulses and two sources of direct current, the source of alternating current normally shunted, the sources of direct current normally opposing each other; two transmitting keys, one of said keys adapted to shunt one of the sources of direct current, the second key adapted to shunt the second source of direct current and means for both keys to open the shunt of the source of alternating current.

5. A transmitting circuit for a telegraphic system adapted to transmit two messages simultaneously, said transmitting circuit comprising two sources of current inserted in the line in opposite directions and a generator of alternating pulses, a shunt for said generator, two transmitting keys, means for one of said keys to shunt one of the first named sources, means for the second key to shunt the second of the first named sources and means operatively related to both keys to open the shunt of the alternating generator.

6. In a transmitting circuit for diplex telegraphy, sources of direct current of opposite polarity, a key for transmitting impulses from each source, a source of alternating current, and means for causing the transmission of impulses of current from the alternating source upon the simultaneous depression of both keys.

7. The combination with a telegraph line, of a source of current of one character, a source of current of another character, two transmitting devices, and means for connecting the current source of one character to the line when either transmitting device is operated and for connecting the source of another character to the line as a result of the simultaneous operation of the transmitting devices.

8. In a telegraphic receiving system, a line relay having opposite contacts, a translating device controlled at each contact, and means for maintaining both translating devices operated when both line relay contacts are rapidly opened and closed.

In testimony whereof, I affix my signature in the presence of two witnesses.

ISIDOR KITSEE.

Witnesses:
MARY C. SMITH,
EDITH R. STILLEY.

Copies of this patent may be obtained for five cents each, by addressing the "Commissioner of Patents, Washington, D. C."